(12) United States Patent
Mori

(10) Patent No.: US 10,906,750 B2
(45) Date of Patent: Feb. 2, 2021

(54) ARTICLE SORTING FACILITY

(71) Applicant: Daifuku Co., Ltd., Osaka (JP)

(72) Inventor: Hiroyuki Mori, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 16/432,101

(22) Filed: Jun. 5, 2019

(65) Prior Publication Data

US 2020/0017313 A1 Jan. 16, 2020

(30) Foreign Application Priority Data

Jul. 13, 2018 (JP) ................................. 2018-133521

(51) Int. Cl.
- B65G 47/64 (2006.01)
- B65G 15/12 (2006.01)
- B65G 1/04 (2006.01)

(52) U.S. Cl.
CPC ......... B65G 47/642 (2013.01); B65G 1/0492 (2013.01); B65G 15/12 (2013.01); B65G 47/64 (2013.01)

(58) Field of Classification Search
CPC ...... B65G 47/64; B65G 47/642; B65G 15/12; B65G 1/0492; B65G 1/065; B65G 47/50
USPC .................. 198/357, 358, 349, 349.1–349.9; 414/279
See application file for complete search history.

(56) References Cited

U.S. PATENT DOCUMENTS

| | | | |
|---|---|---|---|
| 6,877,944 B2* | 4/2005 | Peiter | H01L 21/67724 198/465.2 |
| 8,205,558 B2* | 6/2012 | Horn | H01L 21/67769 104/91 |
| 2008/0035449 A1* | 2/2008 | Lee | H01L 21/67276 198/349 |
| 2013/0302132 A1* | 11/2013 | D'Andrea | G06Q 10/08 414/807 |
| 2015/0053530 A1* | 2/2015 | Schneider | B24B 13/0037 198/347.1 |
| 2016/0280461 A1* | 9/2016 | Geiger | B66F 9/063 |
| 2017/0057744 A1* | 3/2017 | Warries | B65G 1/1373 |

FOREIGN PATENT DOCUMENTS

JP 2011246234 A 12/2011

* cited by examiner

Primary Examiner — James R Bidwell
(74) Attorney, Agent, or Firm — The Webb Law Firm

(57) ABSTRACT

An article sorting facility includes a plurality of storage members each configured to store one or more articles, a plurality of article transport vehicles each capable of traveling in at least a portion of a preset travel lane with one or more support members on board, each support member being configured to support one or more articles; a plurality of work areas each configured to allow work to be performed to transfer articles between one or more storage members and at least one of the one or more support members on board an article transport vehicle in the travel lane, wherein each of the work areas is located adjacent to one or more storage members and to the travel lane, wherein the plurality of work areas are arranged one adjacent to another along the travel lane, and wherein two or more article transport vehicles are in the travel lane simultaneously to travel in a line.

13 Claims, 9 Drawing Sheets though the containers are being transported but not used in the transfer work in certain work areas, which in turn reduces efficiency of transfer work in work areas. Thus, with the article sorting facility described above, there is room for improvement to improve the work efficiency in work areas.

ARTICLE SORTING FACILITY

CROSS-REFERENCE TO RELATED APPLICATION

This application claims priority to Japanese Patent Application No. 2018-133521 filed Jul. 13, 2018, the disclosure of which is hereby incorporated by reference in its entirety.

FIELD OF THE INVENTION

The present invention relates to an article sorting facility which comprises a plurality of storage members each configured to store one or more articles, and a plurality of work areas each configured to allow work to be performed to transfer articles.

BACKGROUND

An example of such a conventional article sorting facility is described in JP Publication of Application No. 2011-246234 (Patent Document 1). In the article sorting facility of Patent Document 1, a worker is located in each of a plurality of work areas and a conveyor (first straight forward transporting line 21A) which extends along the plurality of work areas is installed for transporting article collecting containers (article collecting containers 10). The worker in each work area performs transfer work in which the worker removes articles from one or more storage members and placed them in article collecting containers.

SUMMARY OF THE INVENTION

With the article sorting facility described above, transporting of all article collecting containers stops if a conveyor is stopped because transfer work took too much time in a specific work area, for example. Since this may lead to a situation in which transfer work in other work areas have to be interrupted, such situation may reduce the efficiency of the transfer work in each work area. In addition, for example, article collecting containers are transported one after another along the entire length of the conveyor. Thus, when working in a work area, all the article collecting containers are transported one after another (including ones that are not used in the particular work area) on a portion of the conveyor that corresponds to the work area. Thus, the efficiency in transporting article collecting containers that are used in transfer work is reduced by the amount that corresponds to the number of article collecting containers that are being transported but not used in the transfer work in certain work areas, which in turn reduces efficiency of transfer work in work areas. Thus, with the article sorting facility described above, there is room for improvement to improve the work efficiency in work areas.

Thus, an article sorting facility is desired which can further improve work efficiency in the work areas.

An article sorting facility in accordance with the present disclosure comprises: a plurality of storage members, each configured to store one or more articles; a plurality of article transport vehicles each capable of traveling in at least a portion of a preset travel lane with one or more support members on board, each support member being configured to support one or more articles; a plurality of work areas each configured to allow work to be performed to transfer articles between one or more storage members and at least one of the one or more support members on board an article transport vehicle in the travel lane, wherein each of the work areas is located adjacent to one or more storage members and to the travel lane, wherein the plurality of work areas are arranged one adjacent to another along the travel lane, and wherein two or more article transport vehicles are in the travel lane simultaneously to travel in a line.

With such an arrangement, articles are transported by article transport vehicles, with the articles supported by the support members, after the articles are transferred to the article transport vehicles in the travel lane. Therefore, even when, for example, an article transport vehicle to which articles are transferred is caused to stop traveling because of the transfer work taking too much time in a particular work area, another article transport vehicle traveling ahead of the stopped article transport vehicle, or another article transport vehicle traveling behind, and with some distance from, the stopped article transport vehicle can continue traveling without stopping. Therefore, workers in other work areas can continue with their transfer work to transfer articles to the article transport vehicles. Thus, the arrangement above helps reduce the lowering of efficiency of transfer work in other work areas caused by transfer work taking too much time in one or more work areas. In addition, by causing any article transport vehicle, to which all required articles have been transferred, to move out of the travel lane, the ratio of the article transport vehicles in the travel lane, to which articles need to be transferred, to the article transport vehicles in the travel lane, to which no more articles need to be transferred, can be increased. Such an arrangement helps improve work efficiency in the work areas.

DETAILED DESCRIPTION OF EMBODIMENTS

1. First Embodiment

Figure 1:
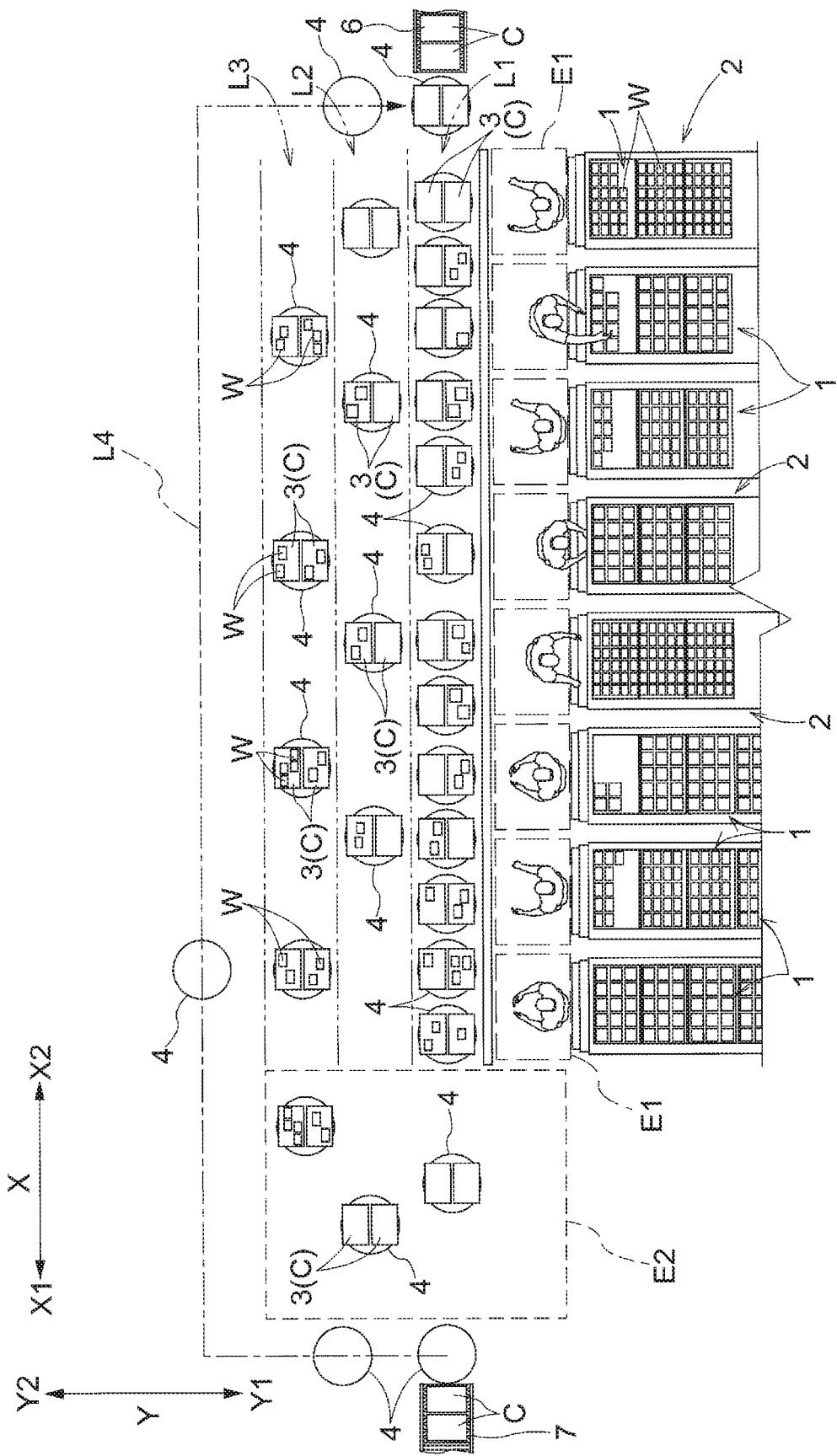
FIG. 1 is a plan view of an article sorting facility of a first embodiment.

The first embodiment of an article sorting facility is described with reference to the drawings. As shown in FIG. 1, an article sorting facility of the present embodiment comprises article storage racks 2 having a plurality of storage members 1 each configured to store articles W, a plurality of article transport vehicles 4 each capable of traveling in at least a portion of a preset travel lane L1 with support members 3 on board with each support member 3 being configured to support one or more articles W, and a plurality of work areas E1 each configured to allow work to be performed to transfer articles W between storage members 1 and the support members 3 of an article transport vehicle 4 in the travel lane L1. In the present embodiment, work performed in each work area E1 is "picking" in which a worker transfers articles W from storage members 1 to the support members 3 of article transport vehicles 4 in the travel lane L1. In addition, the article sorting facility further comprises a controller H (see FIG. 4) which is configured to manage (for example, keeps and update records of the kinds, locations, and the number, and other information, of) the articles W stored in the article storage racks 2, and to control the article transport vehicles 4, among other things. Each controller in the present embodiment (such as the controller H and the vehicle controller 20) has a CPU, memory circuitry, and communication circuitry to interface with other relevant components such as sensors, and/or actuators through wires or wirelessly, as well as algorithms in the form of computer code stored in memory and executable by the CPU to perform required functions.

A transfer area E2 is provided at a location downstream of the travel lane L1 with respect to the travel direction of the article transport vehicles 4. Two or more article transport vehicles 4 are in the travel lane L1 simultaneously to travel in a line. In the transfer area E2 in contrast, the article transport vehicles 4 travel without restrictions in terms of their travel directions or travel paths. The transfer area E2 is an area in which a plurality of article transport vehicles 4 are allowed to travel without being in a line and without being required to maintain the traveling order (i.e., an article transport vehicle 4 traveling behind another is allowed to move ahead of the another). A greater number of article transport vehicles 4 than the number of the work areas E1 travel in the travel lane L1 simultaneously. And a plurality of article transport vehicles 4 travel such that there are one or more article transport vehicles 4 in each of the plurality of lane areas LE (see FIG. 2). It is preferable that a greater number of article transport vehicles 4 than the number of the work areas E1 travel in the travel lane L1 at any one time. For example, it is preferable that twice as many, or more, of article transport vehicles 4 as the work areas E1 be arranged to travel in the travel lane L1 at any one time.

Figure 2:
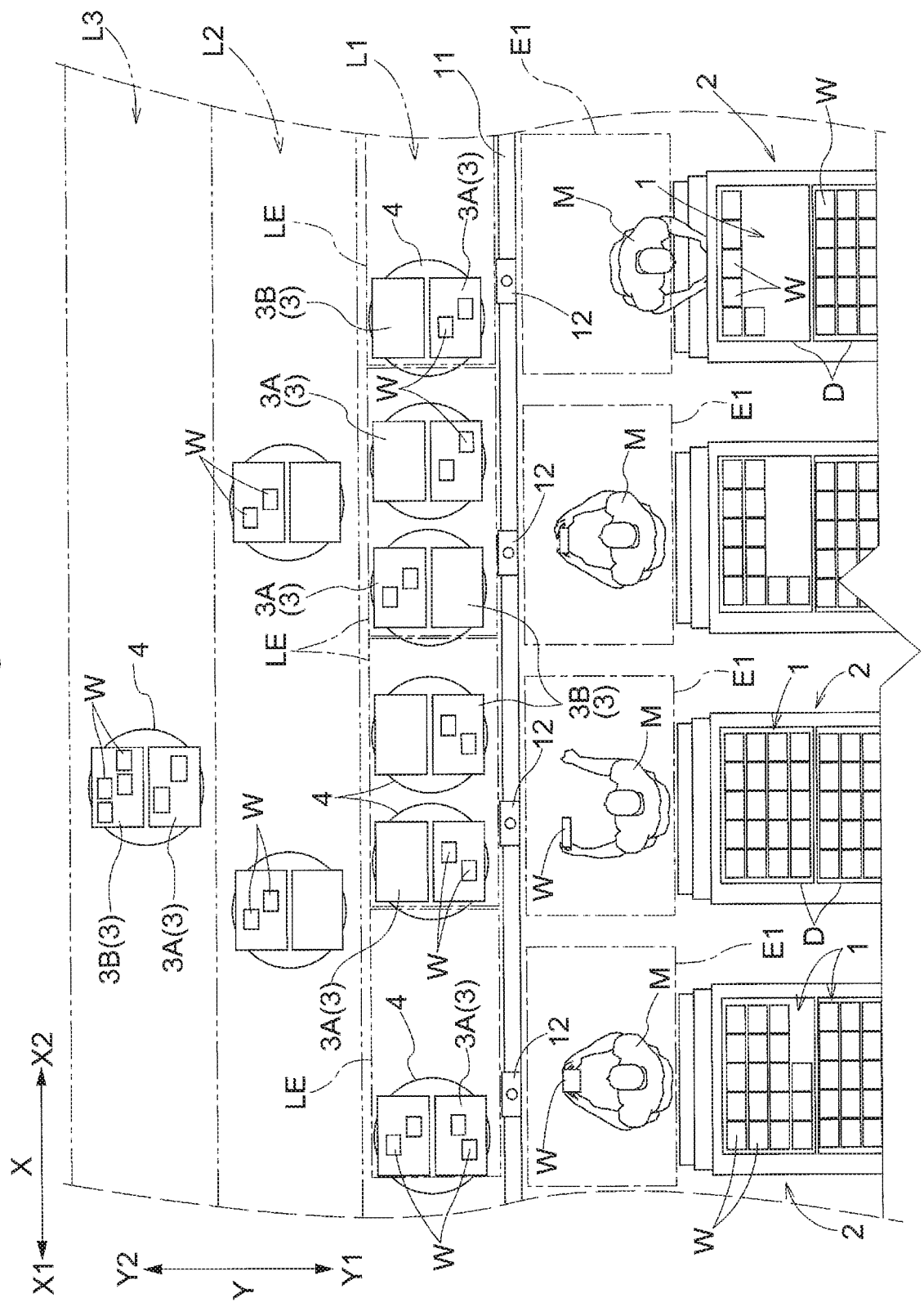
FIG. 2 is an enlarged plan view of a portion of the article sorting facility of the first embodiment.

In addition to the travel lane L1, the article sorting facility is provided with a branch lane L2 and a completed lane L3 each of which allows an article transport vehicle to travel in parallel to another article transport vehicle 4 that is traveling in the travel lane L1. The branch lane L2 and the completed lane L3 are disposed to extend parallel to the travel lane L1. A plurality of article transport vehicles 4 travel in the same direction in the travel lane L1, the branch lane L2, and the completed lane L3. As shown in FIG. 2, the travel lane L1 has the lane areas LE that correspond in location to the work areas E1 with each lane area LE corresponding to a work area E1.

As shown in FIG. 1, the downstream side end portions of the travel lane L1, the branch lane L2, and the completed lane L3 are all connected to the transfer area E2. In addition, the upstream side end portion of a return lane L4 is connected to the transfer area E2. The downstream side end portion of the return lane L4 is connected to the upstream side end portions of the travel lane L1 and the branch lane L2. Each article transport vehicles 4 enters the transfer area E2 from the downstream side end portion of the travel lane L1, the branch lane L2, or the completed lane L3, and enters the upstream side end portion of the return lane L4 from the transfer area E2. In addition, each article transport vehicle 4 enters the upstream side end portion of the travel lane L1 or the branch lane L2 from the downstream side end portion of the return lane L4. Thus, looped paths along which the article transport vehicles 4 travel are formed by the three lanes (the travel lane L1, the branch lane L2, the completed lane L3), the transfer area E2, and the return lane L4.

A container supplying station 6 from which each article transport vehicle 4 receives containers C is provided at or adjacent to the downstream side end portion of the return lane L4. And a container receiving station 7 to which the containers C are delivered from each article transport vehicle 4 is provided at or adjacent to the upstream side end portion of the return lane L4. The article transport vehicles 4 receive empty containers C (in which no articles W are held) from the container supplying station 6. Articles W are placed in containers C by workers M while the article transport vehicles 4 are traveling in the travel lane L1. The article transport vehicles 4 deliver the containers C with articles W held within to the container receiving station 7. In the present embodiment, the support members 3 on each article transport vehicle 4 are the two containers C received from the container supplying station 6.

The article sorting facility is described in greater detail next. As shown in FIG. 2, in the following description, a direction parallel to the travel lane L1 will be referred to as the first direction X with a first side X1 along the first direction X being the downstream side (forward side) of the travel direction when an article transport vehicle 4 is traveling parallel to the travel lane L1 and with a second side X2 along the first direction X being the side opposite from the first side X1. In addition, a direction perpendicular to the first direction X in a top-down view along the vertical direction Z will be referred to as a second direction Y with a first side Y1 along the second direction Y is the side along the second direction Y on which an article storage rack 2 is located with respect to the corresponding work area E1 and with a second side Y2 along the second direction Y being the side opposite from the second side X1. Note that, in the present embodiment, the first side Y1 along the second direction Y is the work side on which an work area E1 is located with respect to the travel lane L1.

The branch lane L2 is formed to be located adjacent to, and to the second side Y2 along the second direction Y of, the travel lane L1. The completed lane L3 is formed to be located adjacent to, and to the second side Y2 along the second direction Y of, the branch lane L2. A plurality of work areas E1 are formed to be located adjacent to, and to the first side Y1 along the second direction Y of, the travel lane L1. A plurality of article storage racks 2 are located adjacent to, and to the first side Y1 along the second direction Y of, the plurality of work areas E1. The travel lane L1, the branch lane L2, the completed lane L3, and a row of the plurality of work areas E1 are formed to extend parallel to the first direction X. In addition, the plurality of article storage racks 2 are installed to form a row parallel to the first direction X.

Figure 3:
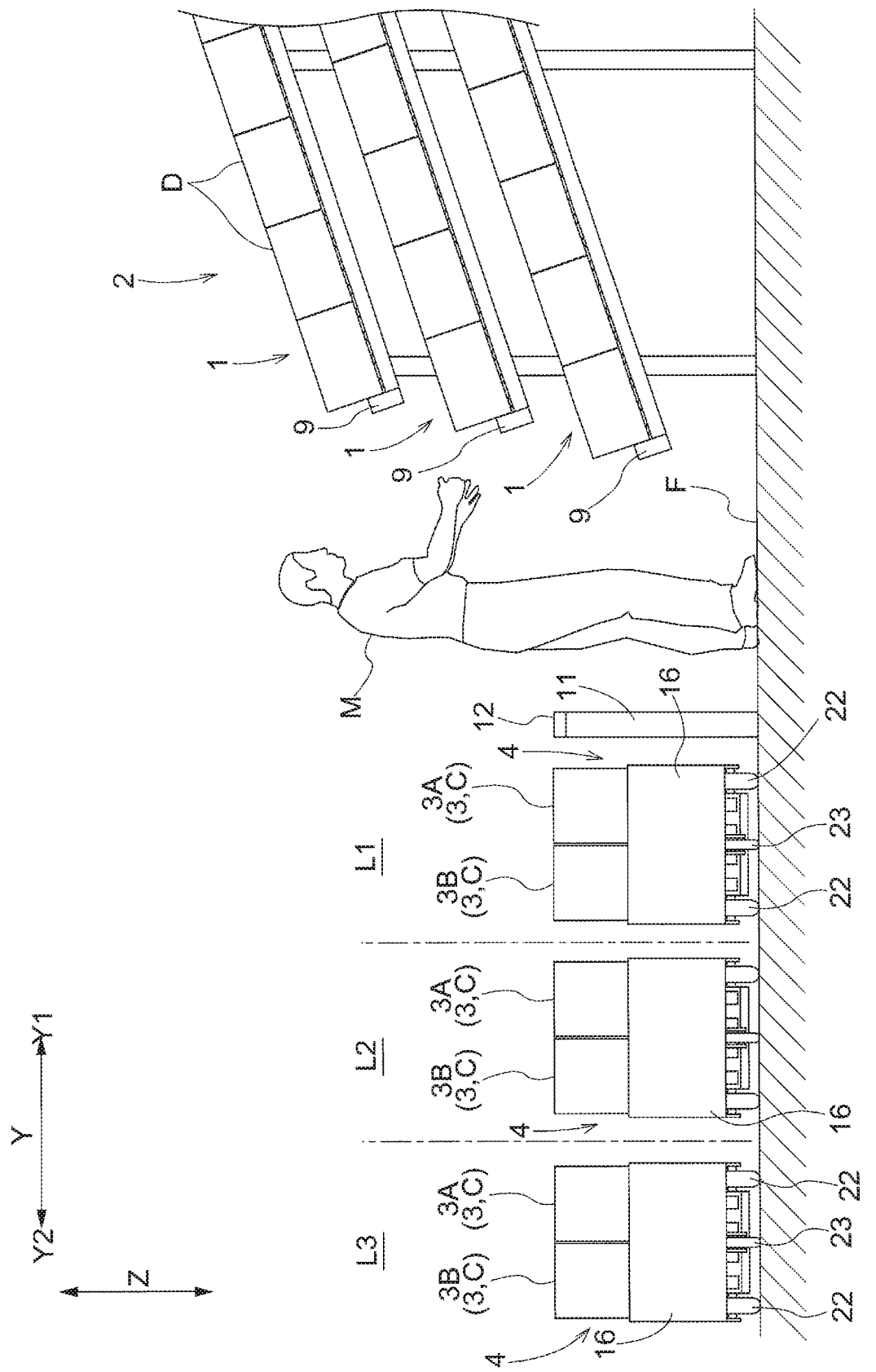
FIG. 3 is a side view of the article sorting facility of the first embodiment.

As shown in FIG. 3, each article storage rack 2 has a plurality of storage members 1 arranged one above another along the vertical direction Z with each storage member 1 being configured to store articles W. In the present example, each storage member 1 is tilted downward toward its end on the second side Y2 along the second direction Y such that an article W placed on the storage member's portion on the first side Y1 along the second direction Y would slide down the storage member 1 under its own weight toward and reach the storage member's end on the second side Y2 along the second direction Y if unobstructed. Therefore, each storage member 1 is a tilted shelf member in the present example. Note that, in the present embodiment, the articles W are stored in article storage racks 2 with articles W placed in containers D for storing purposes (or storage containers D for short).

A plurality of kinds of articles W are stored on a plurality of storage members 1 with the same kind of articles W being grouped together. And each storage member 1 is used to store one kind of articles W. A display 9 is provided at the end portion (of each storage member 1) that is on the second side Y2 along the second direction Y. Each such display 9 is configured to be capable of displaying or providing, among other things, a target storage member indication that indicates that the storage member 1 it is provided to is the one from which one or more articles W need to be removed in picking work, as well as an indication as to the number of articles W to be removed from the storage member 1. Each display 9 is controlled by the controller H (see FIG. 4).

As shown in FIGS. 1 and 2, a plurality of work areas E1 are provided along the first direction X. Each of the plurality of work areas E1 has one article storage rack 2 installed to correspond thereto. Each of the work areas E1 is located adjacent to both storage members 1 and the travel lane L1. And the plurality of work areas E1 are arranged one adjacent or next to another along, or parallel to, the travel lane L1.

As shown in FIG. 2, a low wall or a low partition 11 which partitions off the travel lane L1 from the plurality of work areas E1 is installed between the travel lane L1 and the plurality of work areas E1 along the second direction Y. In addition, an indicator lamp 12 for indicating the article transport vehicle 4 that is the target of picking work (i.e. article transport vehicle 4 to which one or more article W need to be transferred in picking work) is provided to correspond to each of the plurality of work areas E1. Each indicator lamp 12 is located between the corresponding work area E1 and the travel lane L1 and at a location along the first direction X that corresponds to a central portion, along the first direction X, of the corresponding work area. The indicator lamp 12 is turned on when the article transport vehicle 4 that is the target of picking work is in the corresponding lane area LE. And the indicator lamp 12 is turned off when the article transport vehicle 4 that is the target of picking work is not in the corresponding lane area LE. Each indicator lamp 12 is controlled by the controller H (see FIG. 4).

Each of the work areas E1 allows, and has in operation, a worker M assigned thereto to work therein. The worker M in a work area E1 performs picking work by retrieving one or more articles W from one or more storage members 1 that correspond to the work area E1 to which the worker M is assigned, and by placing the one or more articles W in one or both of the support members 3 of an article transport vehicle 4 in the lane area LE to which the worker is assigned. The displays 9 allow the worker to see the location(s) of the storage member(s) from which articles W need to be retrieved as well as the number of the articles W that need to be retrieved from each storage member 1. In addition, the indicator lamp 12 that is turned on allows the worker to identify the article transport vehicle 4 on or in which the articles W picked from the storage member(s) 1 need to be placed. An arrangement is preferably made so that, when two or more article transport vehicles 4 are in a lane area LE, a worker can identify which of the article transport vehicles 4 is the one on or in which the articles W need to be placed among the plurality of article transport vehicles 4, by the different ways the indicator lamp 12 emits light (for example, by emitting light of different colors or lighting patters for different vehicles, etc.). Alternatively, while not shown, two or more indicator lamps 12 may be installed in each work area E1.

Figure 4:
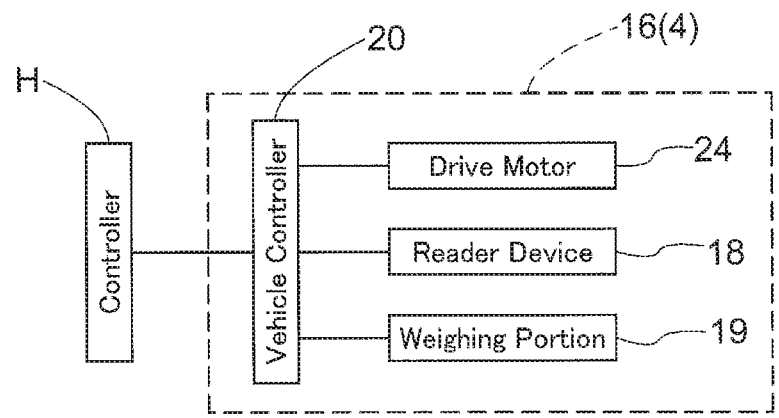
FIG. 4 is a control block diagram for the first embodiment.

The controller H shown in FIG. 4 has stored article information stored therein which is information on the kinds or types of articles W that are stored on the storage members 1. When a picking command is outputted from a superordinate controller, the controller H is configured to transmit picking information to an article transport vehicle 4 based on the picking command and the stored article information. Picking information includes at least one of: (a) information that represents the lane area LE that corresponds to the work area E1 in which picking work needs to be performed, (b) information that represents the position of the support member 3 (i.e., the first support member 3A or the second support member 3B) to which the article(s) W need to be placed in the picking work, (c) kind information that represents the kind or type of article(s) W to be placed in the support member 3, and (d) the number information that represents the number of article(s) W to be placed in the support member 3, As shown in FIG. 3, each article transport vehicle 4 has a travel member 16 which is configured to travel on the floor surface F and to support members 3. As shown in FIG. 4, the travel member 16 is provided with a reader device 18 (such as a 2D barcode reader) configured to read in reference position information provided on the floor surface F, a weighing portion 19 (which includes one or more weighing scales) configured to measure the weight of the articles W supported by the support members 3, and a vehicle controller 20 configured to control the travel member 16. Reference position information is information that indicates reference positions in each lane L1-L4. In the present embodiment, reference position information is provided by two-dimensional codes (such as 2D barcodes) located on the floor surface F, and, more specifically, is provided by tags (for example, first tag T1 and second tag T2 shown in FIG. 7) each attached to the floor surface F and each having a two-dimensional code printed or otherwise displayed thereon. The reference position information provided by each tag not only includes information that indicates that the location of the tag is a reference position, but also includes address information which indicates the location (such as coordinates, or a unique set of numbers assigned to each location, among other possibilities) within the entire paths traveled by the article transport vehicles 4.

Figure 6:
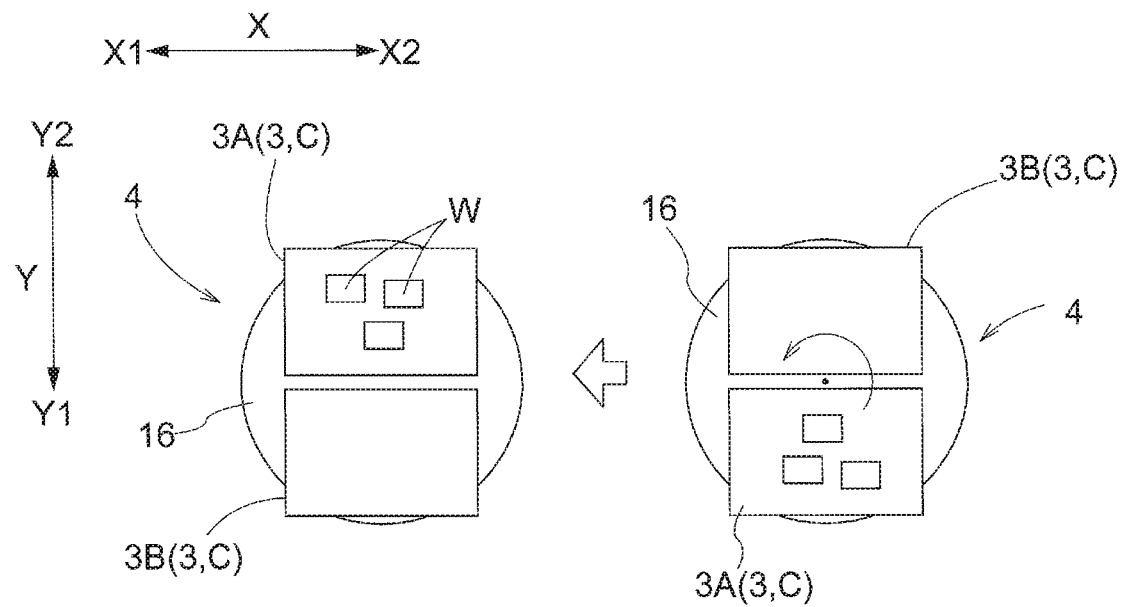
FIG. 6 is a plan view of an article transport vehicle showing both before and after rotating support members in the first embodiment.

As shown in FIG. 6, the support members 3 include a first support member 3A and a second support member 3B, each configured to independently support one or more articles W (the expression "independently support one or more articles W" means that one or more articles W that are supported by the first support member 3A are not supported by the second support member 3B and vice versa). The first support member 3A and the second support member 3B are located horizontally adjacent to each other when placed on board an article transport vehicle 4. In the present embodiment, each of the first support member 3A and the second support member 3B is a container C and is placed on the travel member 16. When one or more support members 3 are placed on, or otherwise supported by, the travel member 16, the one or more support members 3 are said to be on board the article transport vehicle 4; and thus, when that is the case, the article transport vehicle 4 travels "with the one or more support members 3 on board".

As shown in FIG. 3, the travel member 16 of each article transport vehicle 4 has a pair of travel wheels 22 that are spaced apart from each other along a direction perpendicular to the travel direction in which the article transport vehicle 4 travels, as seen along the vertical direction Z, a pair of non-driven wheels 23 with one located on one side and the other located on the other side, along the travel direction, of the pair of travel wheels 22 in a side view (see FIG. 12), and actuators or drive electric motors 24 (see FIG. 4) each of which drivingly rotates corresponding one of the travel wheels 22. When an article transport vehicle 4 is traveling straight forward along the first direction X, the pair of travel wheels 22 are spaced apart from each other along the second direction Y whereas the non-driven wheels 23 are located one and the other side, along the first direction X, of the pair of travel wheels 22 in a side view. The travel member 16 travels forward when both of the pair of travel wheels 22 are rotated in a forward direction by the drive motors 24 and travels backward when both of the pair of travel wheels 22 are rotated in a reverse direction by the drive motors 24.

In addition, the travel member 16 is configured to be capable of changing the speed of the article transport vehicle 4 by changing the rotational speed of the travel wheels 22 when rotating both travel wheels 22 in the forward direction with the drive motors 24. And each of the article transport vehicles 4 is configured to be capable of traveling independently of each other and of independently changing its travel speed. In the present embodiment, each article transport vehicle 4 is configured to be capable of traveling at (and thus of changing speeds from one to any other of) a first speed, a second speed which is greater than the first speed, and a third speed which is less than the first speed. In the present embodiment, the third speed is the speed (i.e., zero) at which the article transport vehicle 4 is at rest.

Each article transport vehicle 4 is capable of changing its direction of travel while traveling, as a result of one drive motor 24 of the travel member 16 rotating one of the travel wheels at a rotational speed that is different from the rotational speed at which the other drive motor 24 is rotating the other of the travel wheels. Each article transport vehicle 4 is capable of changing lanes from the travel lane L1 to the branch lane L2 by changing the direction of travel when traveling in the travel lane L1, as indicated by the arrow (1) in FIG. 5. In addition, each article transport vehicle 4 is capable of changing lanes from the branch lane L2 to the travel lane L1 by changing the direction of travel when traveling in the branch lane L2, as indicated by the arrow (2) in FIG. 5. Thus, each article transport vehicle 4 is configured to be capable of changing lanes from the travel lane L1 to the branch lane L2 and from the branch lane L2 to the travel lane L1. In addition, each article transport vehicle 4 is capable of changing lanes from the travel lane L1 to the completed lane L3 by changing the direction of travel when traveling in the travel lane L1, as indicated by the arrow (3) in FIG. 5. Thus, each article transport vehicle 4 is configured to be capable of changing lanes from the travel lane L1 to the completed lane L3.

As shown in FIG. 6, the article transport vehicle 4 is configured to be capable of rotating the support members 3 about an axis extending along the vertical direction Z. In the travel lane L1, the article transport vehicle 4 is configured to be capable of rotating the support members 3 to a first rotational state (state shown on the right hand side in FIG. 6) in which the first support member 3A is located on the first side Y1 along the second direction Y with respect to the second support member 3B and to a second rotational state (state shown on the left hand side in FIG. 6) in which the second support member 3B is located on the first side Y1 along the second direction Y with respect to the first support member 3A. In the present embodiment, the article transport vehicle 4 is configured to rotate the support members 3 to the first rotational state and to the second rotational state as a result of the travel member 16 turning on the vertical axis using the pair of the travel wheels 22.

The vehicle controller 20 performs, based on picking information transmitted from the controller H, a travel control for controlling the travel member 16, and a determining control for determining whether required picking work has been completed. In the travel control, the vehicle controller 20 controls the travel member 16 to cause the article transport vehicle 4 to travel, in sequence, one or more lane areas LE each of which corresponds to a work area E1 in which picking work needs to be performed. In the determining control, the vehicle controller 20 determines (for each of one or more lane areas LE each corresponding to a work area E1 in which picking work needs to be performed) if the required picking work that needs to be performed in a working area E1 that correspond to the lane area LE has been completed. When reference position information is read by the reader device 18 while the travel control is being performed, the article transport vehicle 4 transmits the reference position information together with the vehicle's own identification code to the controller H. The controller H is configured to learn the locations of the plurality of article transport vehicles 4 based on the identification code and reference position information transmitted from the plurality of article transport vehicles 4.

The weight information which indicates the weight of each article W is stored by the vehicle controller 20. The weighing portion 19 is configured to be capable of weighing the weight of each of a plurality of support members 3 individually, or of weighing the weight of the plurality of support members 3 as a whole. In the determining control, the vehicle controller 20 determines whether the exact number (as indicated by the number information) of articles W of each kind indicated by the kind information have been placed in the specified support member 3, thus whether the required picking work for a given work area E1 has been completed, based on changes in the weight measured by the weighing portion 19, kind information of article(s) W which is provided in the picking information and which indicates the kind(s) of article(s) W that need be placed in and supported by a support member 3, weight information of each article W of each kind indicated by the kind information, and number information for the articles W (the number of the articles W of each kind that need to be picked) indicated by the picking information.

In the travel control, the vehicle controller 20 controls the travel member 16 of each article transport vehicle 4 to cause the article transport vehicle 4 to travel only in the lane areas LE in which picking work needs to be performed. In addition, the vehicle controller 20 controls the travel member 16 of each article transport vehicle 4 to cause the article transport vehicle 4 not to travel in the lane areas LE in which picking work for the article transport vehicle 4 is not performed, and to cause the article transport vehicle 4 to travel in the branch lane L2 or the completed lane L3 which is located to the second side Y2 along the second direction Y of these lane areas LE. More specifically, the travel member 16 is controlled in the travel control as follows.

When picking work needs to be performed in the lane area LE that is located at the end on the second side X2 along the first direction X among the plurality of lane areas LE, an article transport vehicle 4 enters the travel lane L1 from the return lane L4 and travels in the travel lane L1 at the first speed. Also, when no picking work is performed in the lane area LE that is located at the end on the second side X1 along the first direction X among the plurality of lane areas LE, an article transport vehicle 4 enters the branch lane L2 from the return lane L4 and travels in the branch lane L2 at the second speed. And when an article transport vehicle 4 (first article transport vehicle 4) is traveling in any lane and another article transport vehicle 4 (second article transport vehicle 4) is traveling directly ahead (i.e. located to the first side X1 along the first direction X in the same lane) at a lower speed than the first article transport vehicle 4, then the first article transport vehicle 4 reduces its speed to match the speed of the second article transport vehicle 4 such that the first article transport vehicle 4 follows the second article transport vehicle 4 with a preset distance between the two vehicles 4. Note that, in the present embodiment, the present distance is set to be less than the length of each article transport vehicle 4 along the first direction X.

And when an article transport vehicle 4 is traveling in a lane area LE of the travel lane L1, if it is determined in the determining control that picking work has not been completed, then the article transport vehicle 4 travels (or keeps on traveling) in the lane area LE at the first speed. And when an article transport vehicle 4 is traveling in a lane area LE of the travel lane L1, if it is determined in the determining control that picking work has been completed, then the article transport vehicle 4 travels in (the remainder of) the lane area LE at the second speed. As a result of performing the travel control in this manner, when traveling in a lane area LE, each article transport vehicle 4 travels: (a) at the first speed until all the required picking work (that needs to be performed in a work area E1 that corresponds to the lane area LE) to transfer one or more article W to at least one of the support members 3 on board the article transport vehicle 4 is completed in the work area E1; and (b) at the second speed (which is a higher speed than the first speed) after the required picking work to transfer the one or more articles W to the at least one of the support members 3 on board the article transport vehicle 4 has been completed.

And when an article transport vehicle 4 is traveling in a lane area LE, if the article transport vehicle 4 reaches the end of the lane area LE on the first side X1 along the first direction X in spite of the fact that required picking work (that needs to be performed in an work area E1 that corresponds to the lane area LE) has not been completed, then the article transport vehicle 4 reduces its speed to the third speed (i.e. stops). This arrangement prevents an article transport vehicle 4 from leaving a lane area LE before the required picking work that needs to be performed in a work area E1 that corresponds to the lane area LE to transfer articles W to at least one of the support members 3 on board the article transport vehicle 4 is completed in the work area E1.

Figure 5:
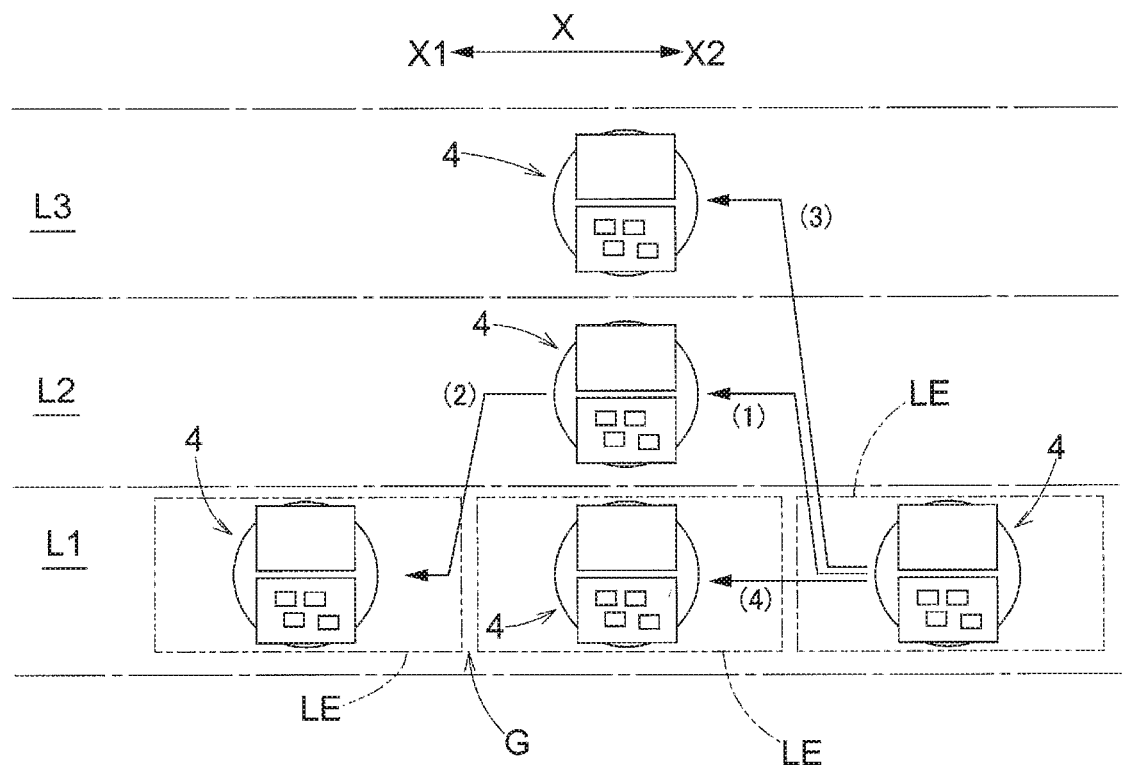
FIG. 5 shows how an article transport vehicle in the first embodiment changes lanes.

When all the required picking work (that need to be performed in the work areas E1 that correspond to all the specified lane areas LE) to transfer articles W to an article transport vehicle 4 has been completed, the article transport vehicle 4 changes lanes from the travel lane L1 to the completed lane L3, as shown with the arrow (3) in FIG. 5. If and when the article transport vehicle 4 changes lanes to the completed lane L3, the article transport vehicle 4 travels in the completed lane L3 at the second speed to the transfer area E2.

When required picking work (that needs to be performed in a work area E1 that corresponds to a lane area LE) to transfer one or more articles W to an article transport vehicle 4 has just been completed, and if picking work, to transfer one or more articles W to that article transport vehicle 4, needs to be performed in the next work area E1 that corresponds to the next lane area LE that is adjacent, on the first side X1 along the first direction X, to the lane area LE corresponding to the work area E1 in which the required picking work has just been completed, then the article transport vehicle 4 continues to travel in the travel lane L1, as shown with the arrow (4) in FIG. 5, at the second speed. The article transport vehicle 4 travels in the lane area LE in the travel lane L1 and reduces its speed to the first speed when it enters the next lane area LE that is adjacent to the lane area LE.

In addition, when required picking work (that needs to be performed in a work area E1 that corresponds to a lane area LE) to transfer one or more articles W to an article transport vehicle 4 has just been completed, and if there is no picking work to be performed for the article transport vehicle 4 in the next work area E1 that corresponds to the lane area LE that is adjacent, on the first side X1 along the first direction X, to the lane area LE corresponding to the work area E1 in which the required picking work has just been completed, then the article transport vehicle 4 changes lanes from the travel lane L1 to the branch lane L2, as shown with the arrow (1) in FIG. 5. If an article transport vehicle 4 changes lanes to the branch lane L2, it travels in the branch lane L2 at the second speed, after which, as shown with the arrow (2) in FIG. 5, the article transport vehicle 4 reduces its speed to the first speed and changes lanes to enter a lane area LE (corresponding to a work area in which the next picking work is to be performed) through or at the lane area's end portion on the second side X2 along the first direction X (this end portion will be referred to as a merging location G).

How an article transport vehicle 4 that is traveling in the branch lane L2 changes lanes to the travel lane L1 is described next.

Figure 7:
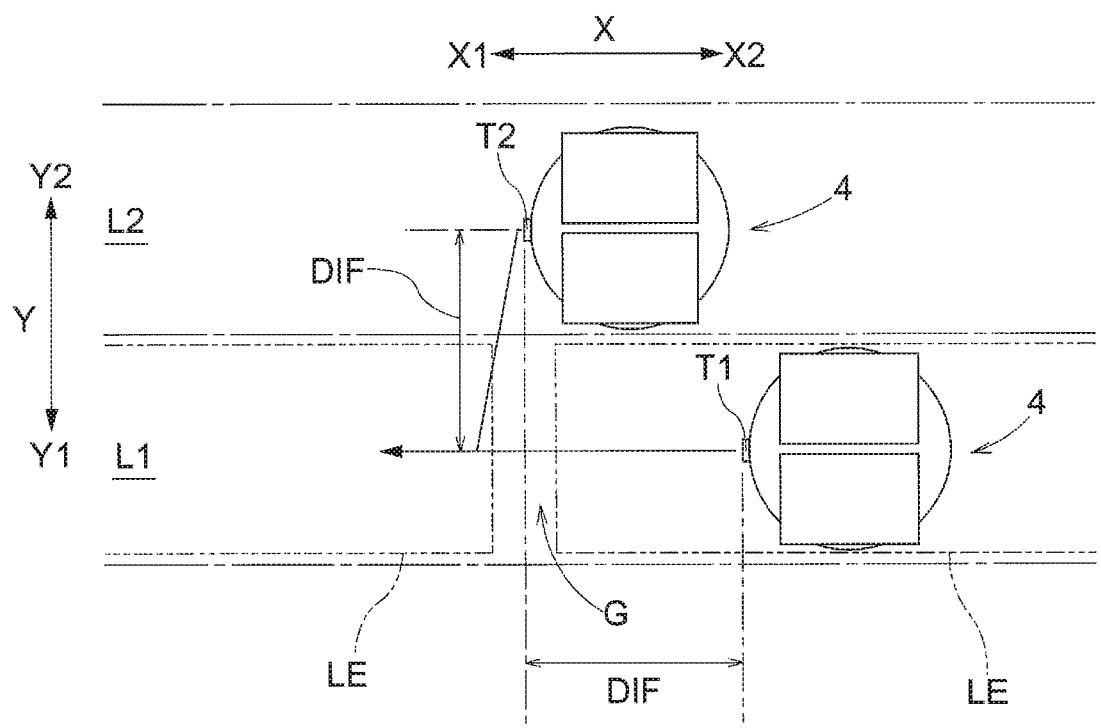
FIG. 7 shows how an article transport vehicle in the first embodiment changes lanes to the travel lane.

As shown in FIG. 7, a first tag T1 is provided at a reference position in the travel lane L1 with the reference position being located short of a corresponding merging location G (i.e., the reference position being so located that an article transport vehicle 4 traveling in the travel lane L1 would reach it before reaching a corresponding merging location G). The first tag T1 indicates, or otherwise provides, reference position information which indicates the location of the first tag T1 as well as the fact that the location is a reference position. An article transport vehicle 4 that is traveling in the travel lane L1 and that has not yet entered a merging location G is capable of reading the reference position information on a first tag T1 by means of the reader device 18. In addition, a second tag T2 is provided at a reference position that is located in the branch lane L2 and short of a location corresponding, along the first direction X, to the merging location G. The second tag T2 indicates, or otherwise provides, reference position information which indicates the location of the second tag T2 as well as the fact that the location is a reference position. An article transport vehicle 4 that is traveling in the branch lane L2 and that has not yet entered the location corresponding, along the first direction X, to the merging location G is capable of reading the reference position information on the second tag T2 by means of the reader device 18. In the present embodiment, the second tag T2 is located to the first side X1 along the first direction X of the first tag T1 and is spaced apart from the first tag T1 by a distance corresponding to the difference DIF between: (a) the distance traveled by an article transport vehicle 4 traveling in the branch lane L2 up to the point in time the article transport vehicle 4 finishes changing lanes to the travel lane L1 and (b) the distance traveled by an article transport vehicle 4 traveling in the travel lane L1 as it continues traveling in the travel lane L1. In the present example, the difference DIF is equal to the distance, along the second direction Y, between the center line (along which tags are located) of the travel lane L1 and the center line (along which tags are located) of the branch lane L2.

When an article transport vehicle 4 traveling in the travel lane L1 reads the reference position information on a first tag T1, it transmits the vehicle's identification code and the reference position information to the controller H. When an article transport vehicle 4 traveling in the branch lane L2 reads the reference position information on a second tag T2 that corresponds to the merging location G that the article transport vehicle 4 needs to enter, it transmits merging information, in addition to the vehicle's identification code and the reference position information, to the controller H. Of an article transport vehicle 4 traveling in the travel lane L1 and an article transport vehicle 4 traveling in the branch lane L2, the controller H causes the article transport vehicle 4 that reads the reference position information before the other to enter the merging location G before the other.

When causing an article transport vehicle 4 traveling in the travel lane L1 to enter a merging location G, if there is another article transport vehicle 4 that is traveling in the branch lane L2 and that reads the reference position information on the corresponding second tag T2 after the article transport vehicle 4 traveling in the travel lane L1 read the reference position information on the corresponding first tag T1 and before it passes through the merging location G, then the controller H transmits merging allowing information (information provided to allow the lane change) to the article transport vehicle 4 traveling in the branch lane L2 after the first article transport vehicle 4 traveling in the travel lane L1 has passed through the merging location G.

When causing an article transport vehicle 4 traveling in the branch lane L2 to enter a merging location G before the other, the controller H transmits merging allowing information to that article transport vehicle 4. Also, when causing an article transport vehicle 4 traveling in the branch lane L2 to enter a merging location G, if there is another article transport vehicle 4 that is traveling in the travel lane L2 and that reads the reference position information on the corresponding first tag T1 after the article transport vehicle 4 traveling in the branch lane L2 reads the reference position information on the corresponding second tag T2 and before it passes through the merging location G, then the controller H transmits merging disallowing information (information provided to disallow the lane change) to the article transport vehicle 4 traveling in the travel lane L1 and subsequently transmits merging allowing information to the article transport vehicle 4 traveling in the travel lane L1 after the article transport vehicle 4 that was traveling in the branch lane L2 has passed through the merging location G.

An article transport vehicle 4 traveling in the travel lane L1 proceeds to enter a merging location G if it does not receive merging disallowing information from the controller H after transmitting the reference position information on the corresponding first tag T1 to the controller H. In addition, if an article transport vehicle 4 traveling in the travel lane L1 receives merging disallowing information from the controller H after transmitting the reference position information on a first tag T1 to the controller H, the article transport vehicle 4 stops before it reaches the merging location G, and subsequently enters the merging location G after it receives merging allowing information from the controller H.

An article transport vehicle 4 traveling in the branch lane L2 proceeds to enter a merging location G if it receives merging allowing information from the controller H after transmitting the reference position information on the corresponding second tag T2 to the controller H. In addition, if an article transport vehicle 4 traveling in the branch lane L2 does not receive merging allowing information from the controller H after transmitting the reference position information on the first tag T1 (that corresponds to a merging location) to the controller H, the article transport vehicle 4 stops before it reaches the merging location G, and subsequently enters the merging location G after it receives merging allowing information from the controller H.

Rotating of the support members 3 while the travel control is being performed is described next. When causing an article transport vehicle 4 to travel in a lane area LE in the travel control, if the support member (for example, first support member 3A) on or in which one or more articles W need be placed in picking work performed in the lane area LE is located on the first side Y1 along the second direction Y of the center of the article transport vehicle 4, then the vehicle controller 20 maintains the rotational state of the support members 3 (first rotational state). In contrast, if the support member (for example, first support member 3A) on or in which one or more articles W need be placed in picking work performed in the lane area LE is located on the second side Y2 along the second direction Y of the center of the article transport vehicle 4, then the vehicle controller 20 changes the rotational state (second rotational state) of the support members 3. In this case, for example, the vehicle controller 20 controls the travel member 16 to change the orientation or relative positions of the support members 3 from the second rotational state to the first rotational state.

A control performed to cause a plurality of article transport vehicles 4 to deliver or hand over the containers C to the receiving station 7 in a preset order is described next. The controller H transmits delivering information to the article transport vehicle 4 that delivers the containers C to the container receiving station 7 before other article transport vehicles 4. The article transport vehicle 4 delivers the containers C to the container receiving station 7 when it receives the delivering information and transmits completion information to the controller H when it completes delivering the containers C. When the controller H receives completion information from an article transport vehicle 4, the controller H transmits delivering information to another article transport vehicle 4 that delivers the containers C to the container receiving station 7 next. As such, a plurality of article transport vehicles 4 are controlled to deliver the containers C to the container receiving station 7 in a preset order as a result of the controller H sequentially transmitting delivering information to the plurality of article transport vehicles 4.

2. Second Embodiment

Figure 8:
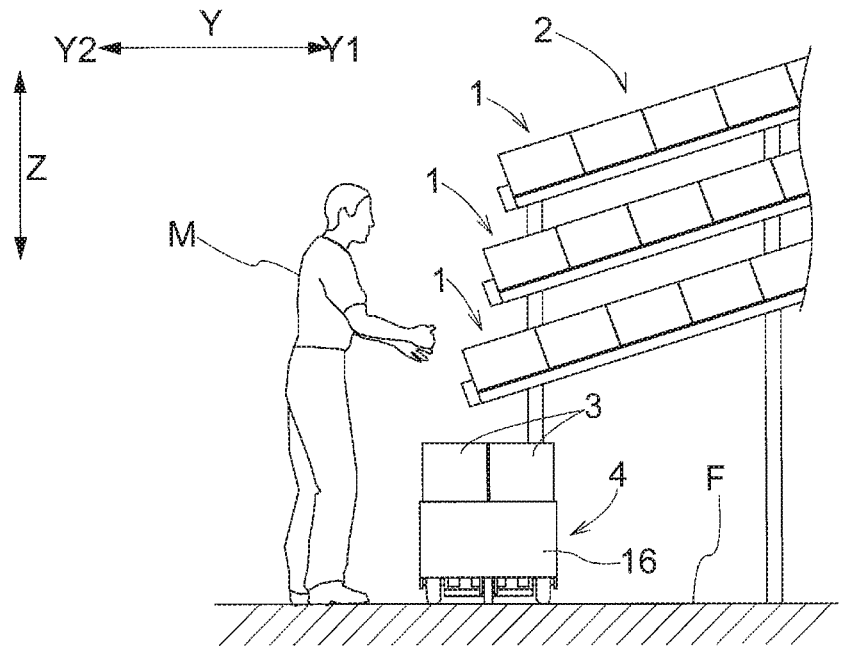
FIG. 8 is a side view of an article sorting facility of the second embodiment.
Figure 9:
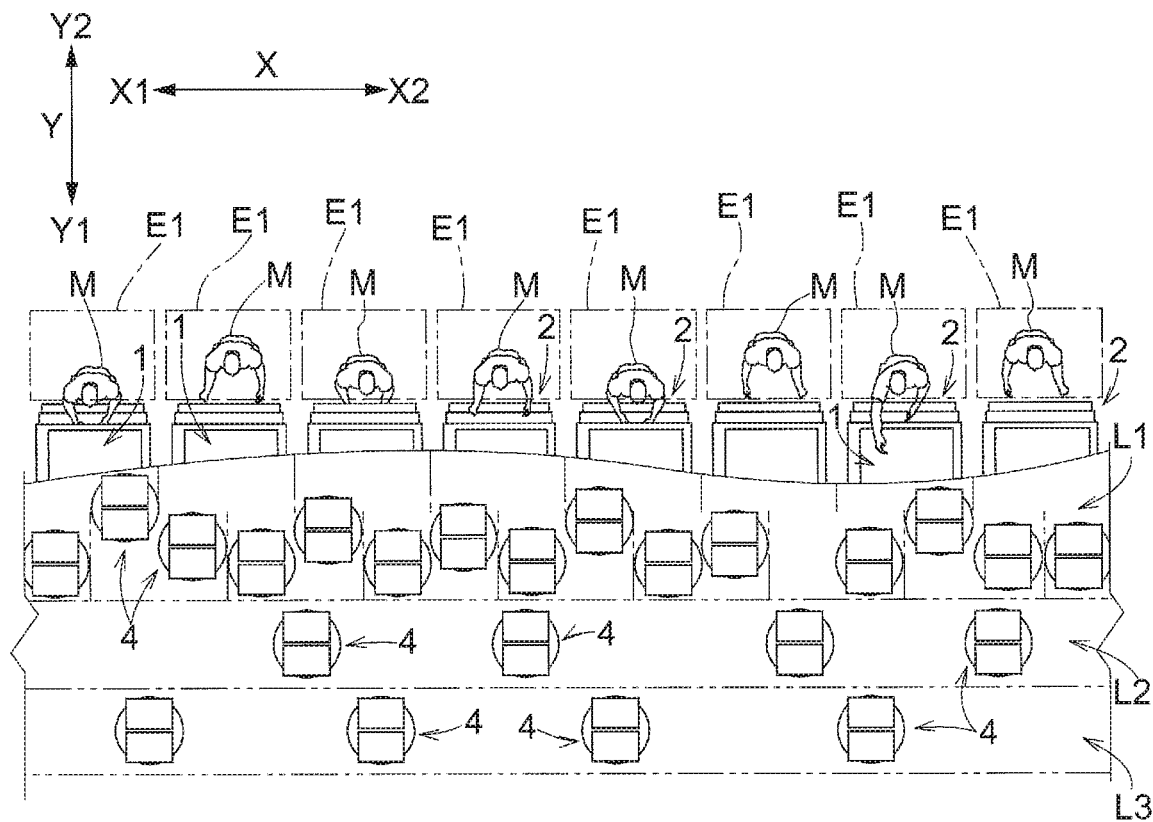
FIG. 9 is a plan view of the article sorting facility of the second embodiment.

The second embodiment of an article sorting facility is described next with reference to FIGS. 8 and 9. The second embodiment is different from the first embodiment in that the travel lane L1 is located to the first side Y1 along the second direction Y of the work areas E1 so that the travel lane L1 and the storage members 1 are located on the same side with respect to the work areas E1. In the description below of the article sorting facility in accordance with the present second embodiment, the focus is placed on features that are different from those of the first embodiment described above. Features of the present embodiment that are not specifically described below should be understood to be identical, or similar, to those of the first embodiment.

The branch lane L2 is formed to be located adjacent to, and to the first side Y1 along the second direction Y of, the travel lane L1. The completed lane L3 is formed to be located adjacent to, and to the first side Y1 along the second direction Y of, the branch lane L2. A plurality of work areas E1 are formed to be located adjacent to, and to the second side Y2 along the second direction Y of, the travel lane L1. A plurality of article storage racks 2 are formed to be located adjacent to, and to the first side Y1 along the second direction Y of, the plurality of work areas E1. The travel lane L1 and the plurality of article storage racks 2 overlap as seen along the vertical direction; and the travel lane L1 is located below the article storage racks 2.

The travel lane L1 in the first embodiment is so formed to extend in a straight line so that the entire travel lane L1 is located adjacent to the branch line L2 and the work areas E1. In contrast, the travel lane L1 of the present embodiment is formed in a wave shape and is next to the branch lane L2 and only some portions of the work areas E1 as seen along the vertical direction Z. Note that, in the present embodiment, the second side Y2 along the second direction Y corresponds to the work side on which the work areas E1 are located with respect to the travel lane L1. Note that, in the present embodiment, the travel lane L1 is formed in a wave shape in order to avoid the support frame members of the article storage racks 2. However, if the travel lane L1 does not interfere with the support frame members of the article storage racks 2, the travel lane L1 may be formed to extend in a straight line along the first direction X and to be located to overlap with the article storage racks 2, as seen along the vertical direction Z.

3. Third Embodiment

The third embodiment of an article sorting facility is described next with reference to FIGS. 10 through 12. The second embodiment is different from the first embodiment in that temporary storage stations 31 are installed for the work areas E1. In the description below of the article sorting facility in accordance with the present third embodiment, the focus is placed on features that are different from those of the first embodiment described above. Features of the present embodiment that are not specifically described below should be understood to be identical, or similar, to those of the first embodiment.

Figure 10:
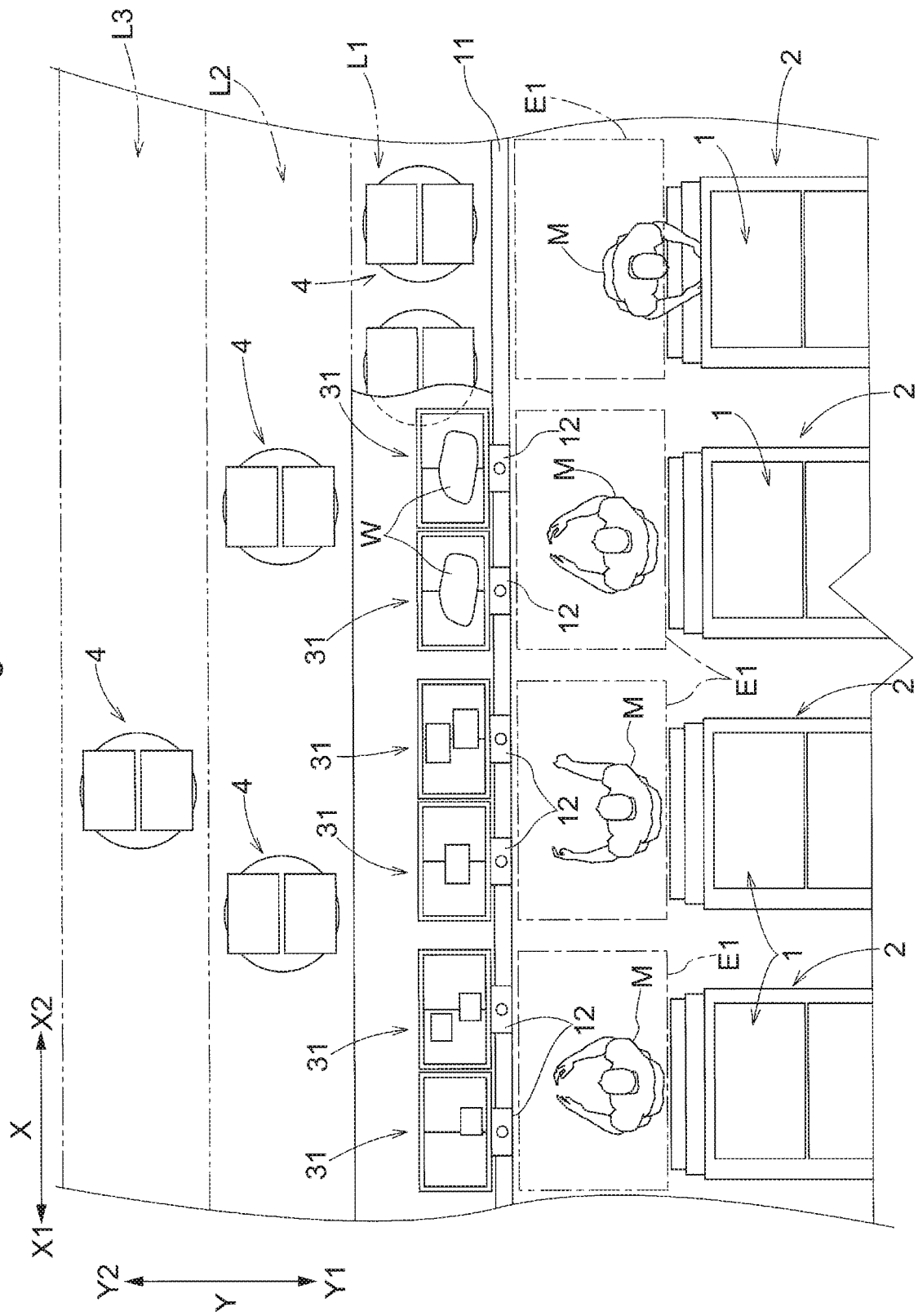
FIG. 10 is a plan view of an article sorting facility of the third embodiment.
Figure 11:
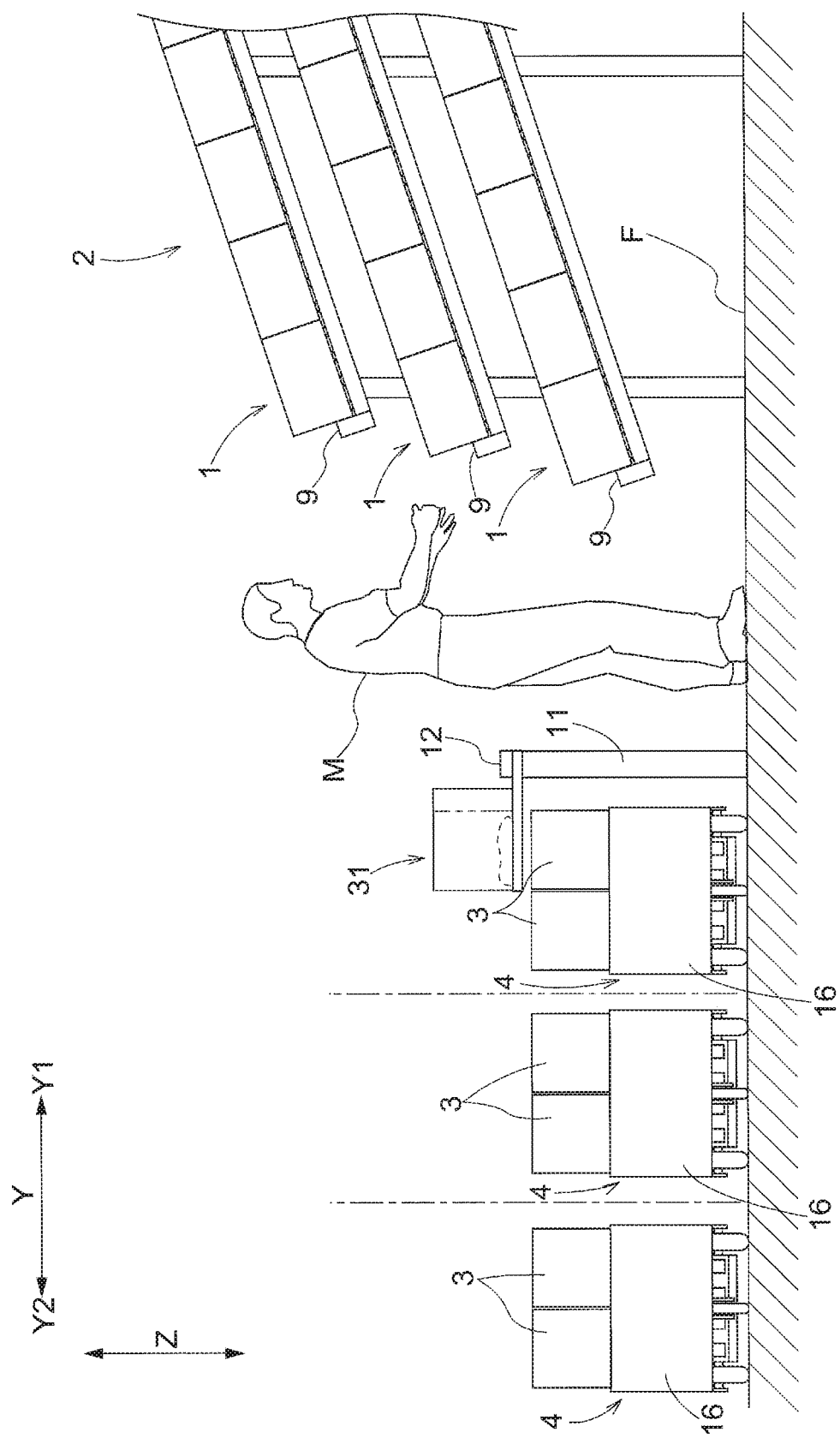
FIG. 11 is a side view of the article sorting facility of the third embodiment.

As shown in FIGS. 10 and 11, at least one temporary storage station 31 is provided for (to correspond to) each work area E1. In the present embodiment, two temporary storage stations 31 are provided for each work area E1. As shown in FIG. 12, each temporary storage station 31 includes a partial enclosure 32 configured to at least partially surround one or more articles W, openable-and-closable members 33 which are capable of supporting one or more articles W placed in the partial enclosure 32, and one or more actuators (not shown) configured to operate (open and close) the openable-and-closable member. 33. Each openable-and-closable member 33 can be moved between a supporting position in which the openable-and-closable member 33 extends horizontally to support the one or more articles W, and an unsupporting position in which the openable-and-closable member 33 extends 32 downward from the partial enclosure 32 and in which no articles W are supported thereby. The temporary storage station 31 is placed in a holding state for holding at least one article W by causing each openable-and-closable member 33 to be in the supporting position, and is placed in a removing state for removing every article W held therein by causing each openable-and-closable member 33 to be in the unsupporting position. As such, the temporary storage station 31 is so configured that its state can be changed between the holding state and the removing state.

Figure 12:
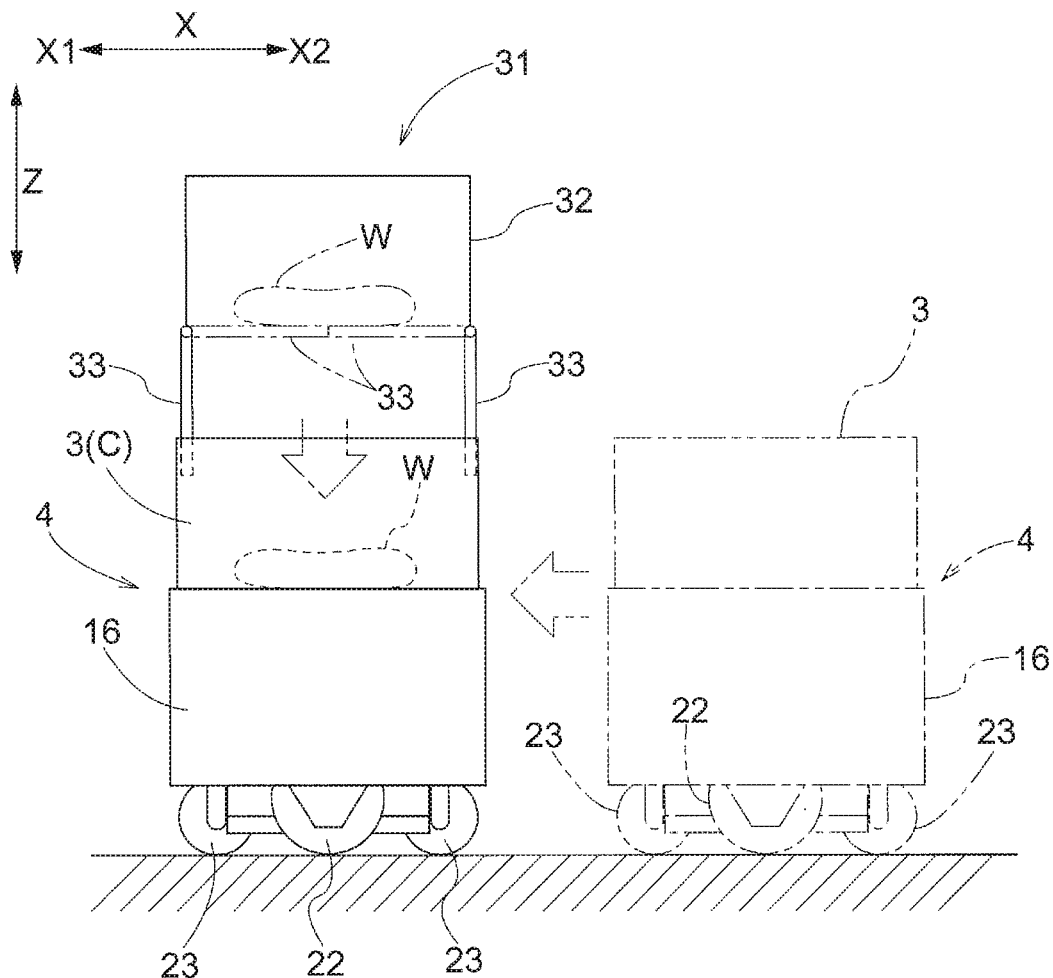
FIG. 12 shows a temporary storage station of the third embodiment before and after it causes a support member to support an article.

As shown with chain double-dashed lines in FIG. 12, a temporary storage station 31 is placed in the holding state when there is no article transport vehicle 4 in the position corresponding to the temporary storage station 31. And, as shown with solid lines in FIG. 12, the temporary storage station 31 is placed in the removing state when an article transport vehicle 4 is in the position corresponding to the temporary storage station 31. More specifically, when an article transport vehicle 4 that is the target of picking work reaches a temporary storage station 31, removing information is transmitted to the temporary storage station 31 from the article transport vehicle 4 or the controller H. The state of the temporary storage station 31 is changed from the holding state to the removing state to remove every article W held to a support member 3 on the article transport vehicle 4. The removed article(s) W is/are then supported by the support member 3 on the article transport vehicle 4. And the temporary storage station 31 is placed in the holding state after a set period of time has elapsed since it was placed in the removing state. Note that the state of each temporary storage station 31 is changed by a controller (not shown and provided to the temporary storage station 31) that controls the one or more actuators that operate the openable-and-closable members 33.

An indicator lamp 12 is provided for each temporary storage station 31. In the present embodiment, the indicator lamp 12 indicates the temporary storage station 31 that is the target of picking work (i.e., in which articles W need to be placed in picking work). The indicator lamp 12 when turned on allows the worker M to identify the temporary storage station 31 by which an article W retrieved from a storage member 1 should be supported. Thus, in the present embodiment, a worker M in a work area E1 performs picking work by retrieving one or more articles W from one or more of the plurality of storage members 1 provided for the work area E1 that is assigned to the worker M and by causing each article W to be supported by a temporary storage station 31 for the lane area LE that is assigned to the worker M. As described above, one or more articles W that were held by a temporary storage station 31 are supported by a support member 3 on an article transport vehicle 4 when the article transport vehicle 4 reaches the temporary storage station 31. As such, in the present embodiment, picking work is performed in which one or more articles W are transferred from one or more storage members 1 to one or more support members 3 of an article transport vehicle 4 in the travel lane L1 by using one or more temporary storage stations 31.

4. Other Embodiments

Other embodiments of an article sorting facility are described next.

(1) In the embodiment described above, an example is described in which each work area E1 allows, and has in operation, a worker M assigned thereto to perform picking work. However, each work area E1 may have a transfer robot (such as, one that has a robot arm with a gripper) assigned thereto which performs the picking work instead. Alternatively, there may be one or more work areas E1 in which human workers M work as well as one or more work areas E1 in which transfer robots are placed. If both one or more work areas E1 in which human workers M work and one or more work areas E1 in which transfer robots are placed are provided, the travel speed of an article transport vehicle 4 when traveling in a lane area LE that corresponds to a work area E1 in which a human worker M works may be set to be different from the travel speed of the article transport vehicle 4 when traveling in a lane area LE that corresponds to a work area E1 in which a transfer robot is placed.

(2) In the embodiment described above, an example is described in which the branch lane L2 and the completed lane L3 are provided in addition to the travel lane L1. However, the invention is not limited to such an arrangement. For example, only the travel lane L1 may be provided. Alternatively, only one of the branch lane L2 and the completed lane L3 may be provided in addition to the travel lane L1.

(3) In the embodiment described above, an example is described in which the travel speed of each article transport vehicle 4 under the travel control can be set at any one of, and be changed from one to another of, three different speeds, namely, the first speed, the second speed, and the third speed. However, an arrangement may be such that the travel speed of each article transport vehicle 4 under the travel control can be set at any one of, and be changed from one to another of, two or four or more different speeds. In addition, the third speed only needs to be a speed that is less than the first speed, and does not have to be the speed (i.e., zero) at which the article transport vehicle 4 is at rest. In addition, the values of the travel speeds of each article transport vehicle 4 under the travel control may be changed as desired.

(4) In the embodiment described above, an example is described in which the support members 3 include two support members, namely, the first support member 3A and the second support member 3B. However, only one support member, or three or more support members may be placed on board each article transport vehicle 4.

(5) In the embodiment described above, an example is described in which each indicator lamp 12 is located between the travel lane L1 and a work area E1. However, the location of each indicator lamp 12 may be changed as desired. For example, an indicator lamp 12 may be installed on each of the plurality of article transport vehicles 4.

(6) In the embodiment described above, an example is described in which the article transport vehicle 4 is configured to be capable of rotating the support members 3 about an axis extending along the vertical direction Z to the first rotational state and the second rotational state. However, the invention is not limited to such an arrangement. For example, each article transport vehicle 4 may have a turntable provided thereto which can be rotated with respect to the travel member 16 about an axis extending along the vertical direction Z, such that the turntable supports the support members 3. In this case, the support members 3a may be rotated to the first rotational state and the second rotational state by rotating the turntable with respect to the travel member 16.

(7) In the embodiment described above, an example is described in which the article sorting facility described is a picking facility in which picking work is performed to collect articles W (that were stored on storage members 1) in or on support members 3 on the article transport vehicles 4. However, the invention is not limited to such example. For example, an article sorting facility may be an assorting facility in which assorting operations are performed to collect articles W (that were in or on support members 3 on the article transport vehicles 4) on storage members 1.

(8) In the embodiment described above, an example is described in which each storage rack 2 is a flow rack with storage member each of which is tilted downward toward its end on the second side Y2 along the second direction Y such that an article W that is placed on the storage member's portion on the first side Y1 along the second direction Y would slide down the storage member 1 under its own weight toward and reach the storage member's end on the second side Y2 along the second direction Y if unobstructed. However, the invention is not limited to such an arrangement. For example, one or more article storage racks 2 may be regular racks in which articles W stored on the storage members 1 do not move along the second direction Y.

In addition, in the embodiment described above, an example is described in which each storage member 1 is a part or a portion of an article storage rack 2. However, the location of a storage member 1 does not have to be limited to such an arrangement. For example, an output station to which articles W retrieved from an automated warehouse are transported may function as a storage member 1. In addition, in the embodiment described above, an example is described in which articles W are stored on storage members 1 with the articles W placed in storage containers D. However, how the articles W are stored may be changed as desired. For example, articles W may be stored on storage members 1 with the articles W placed on planar pallets.

(9) In the embodiment described above, an example is described in which, in the determining control, the vehicle controller 20 determines whether the required picking work has been completed, based on changes in the weight measured by the weighing portion 19, kind information of article(s) W which is provided in the picking information and which indicates the kind(s) of article(s) W that should be placed in and supported by a support member 3, weight information of each article W of each kind indicated by the kind information, and number information for the article(s) W (the number of the article(s) W of each kind that need to be picked) indicated by the picking information. However, how the determination of whether the picking work has been completed is made in the determining control may be changed as desired. For example, an operating portion (in the form of an operating panel, for example) including tape switches etc. may be provided near each indicator lamp 12. And when a worker M completes the required picking work, the worker operates the operating portion, which results in operation information (which indicates that the operating panel has been operated) being transmitted to the article transport vehicle 4. And, in the determining control, the vehicle controller 20 may determine that the required picking work has been completed, when the article transport vehicle 4 receives the operation information. Alternatively, or in addition, a two dimensional code, such as a 2D barcode, with information that indicates the kind of the article W may be displayed on the article W. Each time a worker M places an article W on a support member 3 on an article transport vehicle 4, the worker scans the two dimensional code for the article W with a reader (such as a 2D barcode reader). And, in the determining control, the vehicle controller 20 may determine whether the required picking work has been completed, based on kind information of articles W which is provided in the picking information and which indicates the kinds of articles W that should be placed in and supported by one or more support members 3, and number information for the articles W indicated by the picking information, and scanned information that is information scanned or read by the reader.

(10) Note that any arrangement or any feature disclosed in any of the embodiments described above can also be used in combination with any arrangement or feature disclosed in any other embodiment unless inconsistency arises. Regarding any arrangements and features, the embodiments disclosed in the present description are provided for the purposes of illustration only regarding all aspects. Therefore, it is possible to make various suitable changes without departing from the spirit of the present disclosure.

5. Brief Summary of Embodiments Described Above

A brief summary of the article sorting facility described above is provided next.

An article sorting facility comprises: a plurality of storage members, each configured to store one or more articles; a plurality of article transport vehicles each capable of traveling in at least a portion of a preset travel lane with one or more support members on board, each support member being configured to support one or more articles; a plurality of work areas each configured to allow work to be performed to transfer articles between one or more storage members and at least one of the one or more support members on board an article transport vehicle in the travel lane, wherein each of the work areas is located adjacent to one or more storage members and to the travel lane, wherein the plurality of work areas are arranged one adjacent to another along the travel lane, and wherein two or more article transport vehicles are in the travel lane simultaneously to travel in a line.

With such an arrangement, articles are transported by article transport vehicles, with the articles supported by the support members, after the articles are transferred to the article transport vehicles in the travel lane. Therefore, even when, for example, an article transport vehicle to which articles are transferred is caused to stop traveling because of the transfer work taking too much time in a particular work area, another article transport vehicle traveling ahead of the stopped article transport vehicle, or another article transport vehicle traveling behind, and with some distance from, the stopped article transport vehicle can continue traveling without stopping. Therefore, workers in other work areas can continue with their transfer work to transfer articles to the article transport vehicles. Thus, the arrangement above helps reduce the lowering of efficiency of transfer work in other work areas caused by transfer work taking too much time in one or more work areas. In addition, by causing any article transport vehicle, to which all required articles have been transferred, to move out of the travel lane, the ratio of the article transport vehicles in the travel lane, to which articles need to be transferred, to the article transport vehicles in the travel lane, to which no more articles need to be transferred, can be increased. Such an arrangement helps improve work efficiency in the work areas.

Here, the travel lane preferably has lane areas that correspond in location to the work areas with each lane area corresponding to a work area, wherein article transport vehicles preferably travel such that there are one or more article transport vehicles in each of the lane areas.

With such an arrangement, in each of the plurality of work areas, transfer work can be performed to transfer articles to one or more article transport vehicles in the corresponding lane area. This can increase the number of work areas in which transfer work can be performed in parallel with transfer work performed in other work areas, which helps improve the work efficiency in the work areas.

In addition, each of the plurality of article transport vehicles is preferably capable of independently changing its travel speed.

With such an arrangement, the travel speed of each article transport vehicle can be changed suitably based, for example, on the distance to another article transport vehicle traveling immediately ahead and on the progress of the transfer work in an work area, etc. Thus, this feature makes it possible to reduce any excessive distance between two article transport vehicles, and to adjust the travel speed of an article transport vehicle to make it easy to perform transfer work, and further, to increase the travel speed of an article transport vehicle to the extent that would not adversely affect the transfer work. This makes it possible to improve transport efficiency of article transport vehicles, and work efficiency in the work areas.

Also, the travel lane preferably has lane areas that correspond in location to the work areas with each lane area corresponding to a work area, and wherein each of the plurality of article transport vehicles is preferably configured to travel, when traveling in a lane area: (a) at a first speed until all required picking work, that needs to be performed in a work area that corresponds to the lane area, to transfer one or more articles to at least one of the one or more support members on board the article transport vehicle is completed in the work area; and (b) at a second speed, which is a higher speed than the first speed, after the required picking work to transfer the one or more articles to the at least one of the one or more support members on board the article transport vehicle has been completed.

With such an arrangement, each of the plurality of article transport vehicles is caused to travel: (a) at the first speed while the picking work to transfer one or more articles to at least one of the one or more support members is in progress; and (b) at a second speed, which is higher than the first speed, after the required picking work to transfer the one or more articles to the at least one of the one or more support members has been completed. Thus, such an arrangement allows the mean travel speed of the article transport vehicles in the travel lane to be increased as a whole without making it difficult to perform transfer work to transfer articles to a moving article transport vehicle. This makes it possible to improve transport efficiency of article transport vehicles, and work efficiency in the work areas.

In addition, the article sorting facility preferably further comprises: a completed lane which allows an article transport vehicle to travel in parallel to an article transport vehicle that is traveling in the travel lane, wherein each of the plurality of article transport vehicles is preferably configured to be capable of changing lanes from the travel lane to the completed lane.

With such an arrangement, by causing article transport vehicles for which all the required article transfer work has been completed to change lanes from the travel lane to the completed lane and to keep traveling in the completed lane, the ratio of the article transport vehicles in the travel lane, to which additional articles need to be transferred, to the article transport vehicles in the travel lane, to which no more articles need to be transferred, can be increased, for example. This makes it possible to improve work efficiency in the work areas.

In addition, the article sorting facility preferably further comprises: a branch lane which allows an article transport vehicle to travel in parallel to an article transport vehicle that is traveling in the travel lane, wherein each of the plurality of article transport vehicles is preferably configured to be capable of changing lanes from the travel lane to the branch lane and from the branch lane to the travel lane.

With such an arrangement, it is possible to cause an article transport vehicle to travel in the branch lane instead of the travel lane when traveling in a lane area that corresponds to a work area in which there is no transfer work to be performed for the article transport vehicle and to cause the article transport vehicle to travel in the travel lane only when traveling in a lane area that corresponds to a work area in which there is transfer work to be performed for the article transport vehicle. Thus, such an arrangement makes it possible to increase the ratio of the article transport vehicles in the travel lane, to which additional articles need to be transferred, to the article transport vehicles in the travel lane, to which no more articles need to be transferred. This makes it possible to improve work efficiency in the work areas.

Also, the support members preferably include a first support member and a second support member, each configured to independently support one or more articles, wherein the first support member and the second support member are preferably located horizontally adjacent to each other when placed on board an article transport vehicle, wherein, with a work side being a side on which the work areas are located with respect to the travel lane, each of the plurality of article transport vehicles is preferably configured to be capable of rotating the support members about an axis extending along a vertical direction, wherein each of the plurality of article transport vehicles is preferably configured to be capable of rotating the support members, while in the travel lane, to a first rotational state in which the first support member is located on the work side with respect to the second support member and to a second rotational state in which the second support member is located on the work side with respect to the first support member.

With such an arrangement, when transfer work needs to be performed to transfer articles to the first support member, the transfer work can be made easier by placing the support members on the article transport vehicle in the first rotational state. And when transfer work needs to be performed to transfer articles to the second support member, the transfer work can be made easier to perform by placing the support members on the article transport vehicle in the second rotational state. In other words, with such an arrangement, two support members are allowed to be provided as the one or more support members with each support member configured to independently support one or more articles, while making it easier to perform transfer work to either of the two support members.

In addition, each of the plurality of article transport vehicles is preferably provided with a weighing portion configured to measure the weight of one or more articles supported by at least one of the one or more support members.

With such an arrangement, by measuring the weight of one or more articles supported by the at least one of the one or more support members with the weighing portion, it is possible to determine if the at least one of the one or more support members supports an article, and to determine the kind of an article based on the weight of the article if information about the weight of the article can be obtained separately.

Also, a transfer area is preferably provided at a location downstream of the travel lane with respect to the travel direction of article transport vehicles, wherein the transfer area preferably is an area in which article transport vehicles are allowed to travel without being in a line and without being required to maintain the traveling order.

With such an arrangement, because the traveling order of a plurality of article transport vehicles can be changed in the transfer area, a plurality of article transport vehicles may be allowed to travel in an order different from a specified order in the travel lane located upstream of this transfer area. This allows the article transport vehicles in the travel lane to have a greater degree of freedom in terms of the order in which they travel in the travel lane while making it possible to cause the article transport vehicle to travel in the specified order in areas downstream of the transfer area.

In addition, at least one temporary storage station is preferably provided for each work area, wherein each temporary storage station is preferably configured to be capable of being placed in a holding state for holding at least one article and in a removing state for removing every article held therein, wherein each temporary storage station is preferably placed in the holding state when there is no article transport vehicle in a position corresponding to the temporary storage station, and each temporary storage station is preferably placed in the removing state when an article transport vehicle is in the position corresponding to the temporary storage station.

With such an arrangement, a temporary storage station is caused to support at least one article when there is no article transport vehicle in a position corresponding to the temporary storage station, and the temporary storage station is caused to remove every article held therein when an article transport vehicle is in the position corresponding to the temporary storage station to cause the article(s) to be supported by the one or more support members on board the article transport vehicle. This allows a worker to remove article(s), to be transferred to and supported by an article transport vehicle, from one or more storage members in advance even when the article transport vehicle is not in the lane area that corresponds to the work area. Thus, such an arrangement makes it possible to improve work efficiency in the work areas.

INDUSTRIAL APPLICABILITY

Technology in accordance with the present disclosure can be used in an article sorting facility which comprises a plurality of storage members each configured to store one or more articles, and a plurality of work areas each configured to allow work to be performed to transfer articles.

DESCRIPTION OF REFERENCE NUMERALS AND SYMBOLS

1 Storage Member
3 Support Member
3A First Support Member
3B Second Support Member
4 Article Transport Vehicle
19 Weighing Portion
21 Temporary Storage Station
E1 Work area
E2 Transfer Area
L1 Travel Lane
L2 Branch Lane
L3 Completed Lane
LE Lane Area
W Article
Z Vertical Direction

What is claimed is:

1. An article sorting facility comprising:
a plurality of storage members, each configured to store one or more articles;
a plurality of article transport vehicles each capable of traveling in at least a portion of a preset travel lane with one or more support members on board, each support member being configured to support one or more articles; and
a plurality of work areas each configured to allow work to be performed to transfer articles between one or more storage members and at least one of the one or more support members on board an article transport vehicle in the travel lane,
wherein each of the plurality of work areas is configured to permit a worker or a transfer robot to perform article transfer work,
wherein each of the work areas is located adjacent to one or more storage members and to the travel lane as seen along a vertical direction, wherein the plurality of work areas are arranged one adjacent to another along the travel lane, and wherein two or more article transport vehicles are in the travel lane simultaneously to travel in a line,
wherein the article sorting facility further comprises another lane which allows an article transport vehicle to travel in parallel to an article transport vehicle that is traveling in the travel lane,
wherein the travel lane has lane areas that correspond in location to the work areas with each lane area corresponding to a work area, and
wherein the article transport vehicle is configured to be capable of changing lanes at any location along the lanes.

2. The article sorting facility as defined in claim 1,
wherein article transport vehicles travel such that there are one or more article transport vehicles in each of the lane areas.

3. The article sorting facility as defined in claim 1, wherein each of the plurality of article transport vehicles is capable of independently changing its travel speed.

4. The article sorting facility as defined in claim 1, wherein at least one temporary storage station is provided for each work area,
wherein each temporary storage station is configured to be capable of being placed in a holding state for holding at least one article and in a removing state for removing every article held therein,
wherein each temporary storage station is placed in the holding state when there is no article transport vehicle in a position corresponding to the temporary storage station, and
wherein each temporary storage station is placed in the removing state when an article transport vehicle is in the position corresponding to the temporary storage station.

5. The article sorting facility as defined in claim 1, further comprising:
a completed lane which allows an article transport vehicle to travel in parallel to an article transport vehicle that is traveling in the travel lane, and
wherein each of the plurality of article transport vehicles is configured to be capable of changing lanes from the travel lane to the completed lane during traveling in the travel lane.

6. The article sorting facility as defined in claim 1, further comprising:
a branch lane which allows an article transport vehicle to travel in parallel to an article transport vehicle that is traveling in the travel lane, and
wherein each of the plurality of article transport vehicles is configured to be capable of changing lanes from the travel lane to the branch lane during traveling in the traveling lane and from the branch lane to the travel lane during traveling in the branch lane.

7. The article sorting facility as defined in claim 1, wherein the plurality of storage members are disposed on an opposite side to the traveling lanes across the plurality of work areas as seen along the vertical direction.

8. The article sorting facility as defined in claim 1, wherein each of the plurality of article transport vehicles is provided with a weighing portion configured to measure the weight of one or more articles supported by at least one of the one or more support members.

9. The article sorting facility as defined in claim 1, wherein a transfer area is provided at a location downstream of the travel lane with respect to the travel direction of article transport vehicles, the transfer area being an area in which article transport vehicles are allowed to travel without being in a line and without being required to maintain the traveling order.

10. An article storage facility comprising:
a plurality of storage members, each configured to store one or more articles;
a plurality of article transport vehicles each capable of traveling in at least a portion of a preset travel lane with one or more support members on board, each support member being configured to support one or more articles;
a plurality of work areas each configured to allow work to be performed to transfer articles between one or more storage members and at least one of the one or more support members on board an article transport vehicle in the travel lane,
wherein each of the work areas is located adjacent to one or more storage members and to the travel lane,
wherein the plurality of work areas are arranged one adjacent to another along the travel lane,
wherein two or more article transport vehicles are in the travel lane simultaneously to travel in a line,
wherein the travel lane has lane areas that correspond in location to the work areas with each lane area corresponding to a work area, and
wherein each of the plurality of article transport vehicles is configured to travel, when traveling in a lane area: (a) at a first speed until all required picking work, that needs to be performed in a work area that corresponds to the lane area, to transfer one or more articles to at least one of the one or more support members on board the article transport vehicle is completed in the work area; and (b) at a second speed, which is a higher speed than the first speed, after the required picking work to transfer the one or more articles to the at least one of the one or more support members on board the article transport vehicle has been completed.

11. An article storage facility comprising:
a plurality of storage members, each configured to store one or more articles;
a plurality of article transport vehicles each capable of traveling in at least a portion of a preset travel lane with one or more support members on board, each support member being configured to support one or more articles;

a plurality of work areas each configured to allow work to be performed to transfer articles between one or more storage members and at least one of the one or more support members on board an article transport vehicle in the travel lane, wherein each of the work areas is located adjacent to one or more storage members and to the travel lane, wherein the plurality of work areas are arranged one adjacent to another along the travel lane, wherein two or more article transport vehicles are in the travel lane simultaneously to travel in a line, wherein the one or more support members include a first support member and a second support member, each configured to independently support one or more articles, wherein the first support member and the second support member are located horizontally adjacent to each other when placed on board an article transport vehicle, wherein, with a work side being a side on which the work areas are located with respect to the travel lane, wherein each of the plurality of article transport vehicles is configured to be capable of rotating the support members about an axis extending along a vertical direction, and wherein each of the plurality of article transport vehicles is configured to be capable of rotating the support members, while in the travel lane, to a first rotational state in which the first support member is located on the work side with respect to the second support member and to a second rotational state in which the second support member is located on the work side with respect to the first support member.

12. An article sorting facility comprising:

a plurality of storage members, each configured to store one or more articles;

a plurality of article transport vehicles each capable of traveling in at least a portion of a preset travel lane with one or more support members on board, each support member being configured to support one or more articles; and a plurality of work areas each configured to allow work to be performed to transfer articles between one or more storage members and at least one of the one or more support members on board an article transport vehicle in the travel lane, wherein each of the plurality of work areas is configured to permit a worker or a transfer robot to perform article transfer work, wherein each of the work areas is located adjacent to one or more storage members and to the travel lane as seen along a vertical direction, wherein the plurality of work areas are arranged one adjacent to another along the travel lane, and wherein two or more article transport vehicles are in the travel lane simultaneously to travel in a line, and wherein the plurality of storage members and the traveling lanes are disposed on the same side with respect to the plurality of work areas as seen along the vertical direction, and overlap each other as seen along the vertical direction.

13. An article sorting facility comprising:

a plurality of storage members, each configured to store one or more articles;

a plurality of article transport vehicles each capable of traveling in at least a portion of a preset travel lane with one or more support members on board, each support member being configured to support one or more articles; and a plurality of work areas each configured to allow work to be performed to transfer articles between one or more storage members and at least one of the one or more support members on board an article transport vehicle in the travel lane, wherein each of the plurality of work areas is configured to permit a worker or a transfer robot to perform article transfer work, wherein each of the work areas is located adjacent to one or more storage members and to the travel lane as seen along a vertical direction, wherein the plurality of work areas are arranged one adjacent to another along the travel lane, and wherein two or more article transport vehicles are in the travel lane simultaneously to travel in a line, wherein the article sorting facility further comprises a completed lane which allows an article transport vehicle to travel in parallel to an article transport vehicle that is traveling in the travel lane, and a branch lane which allows an article transport vehicle to travel in parallel to an article transport vehicle that is traveling in each of the travel lane and the completed lane, and wherein the completed lane and the branch lane are disposed on an opposite side to the plurality of work areas across the travel lane as seen along the vertical direction.

\* \* \* \* \*